Aug. 24, 1948.   L. L. WEISGLASS   2,447,724
COLOR CONTROL FOR PHOTOGRAPHIC ENLARGERS
Filed Sept. 4, 1945   3 Sheets-Sheet 2
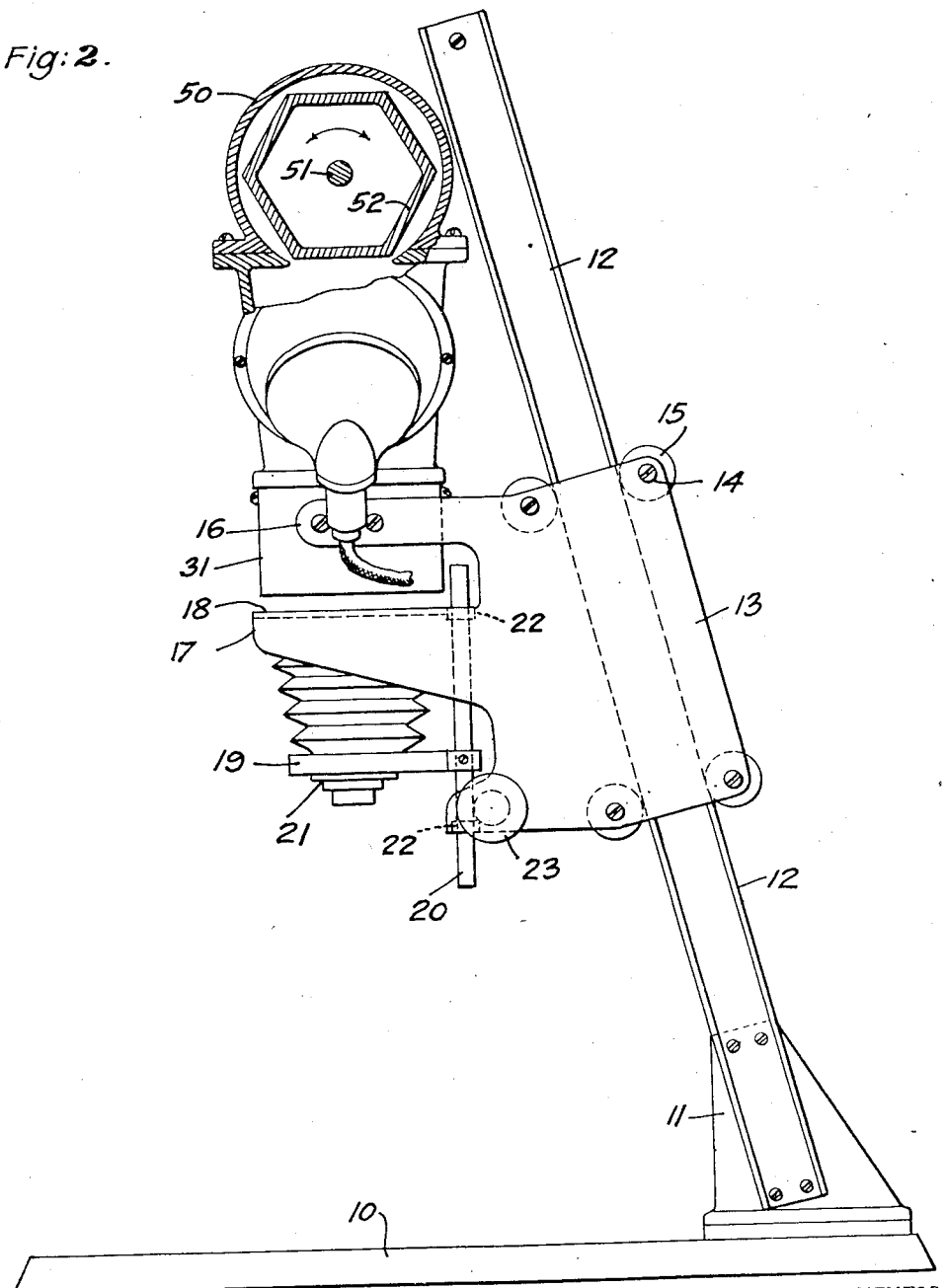
Fig: 2.
INVENTOR:
Louis L. Weisglass
BY Walter E. Wollheim
ATTORNEY.

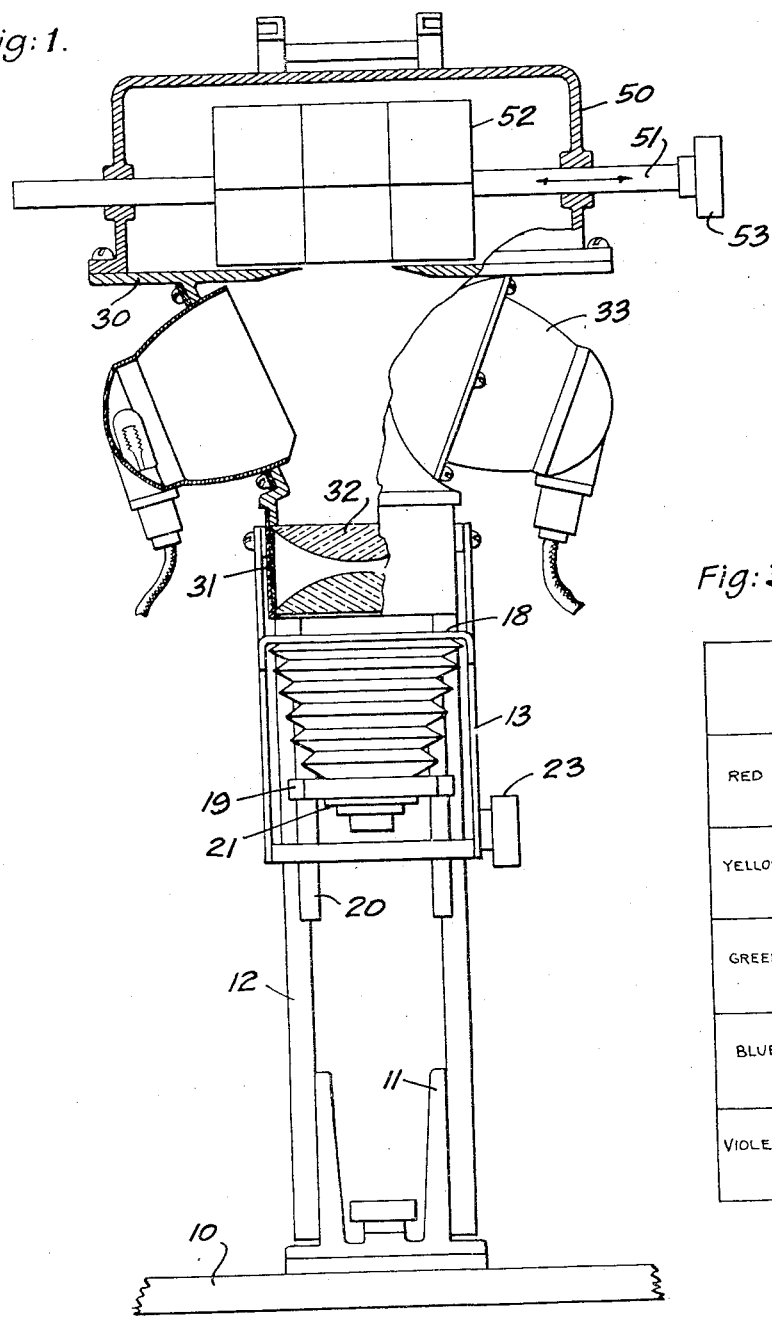

Aug. 24, 1948.  L. L. WEISGLASS  2,447,724
COLOR CONTROL FOR PHOTOGRAPHIC ENLARGERS
Filed Sept. 4, 1945  3 Sheets-Sheet 3
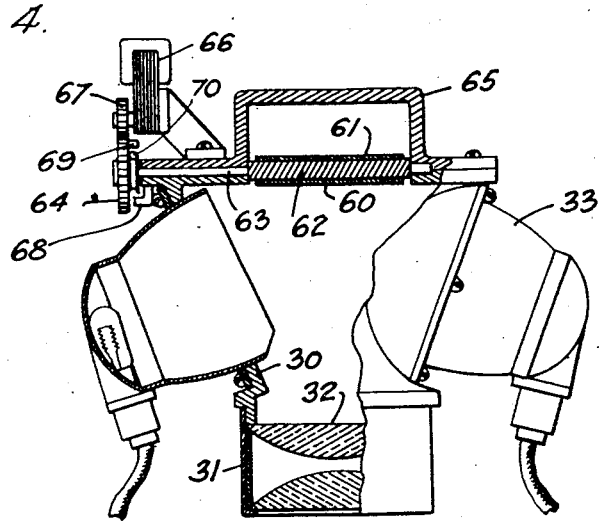
Fig: 4.
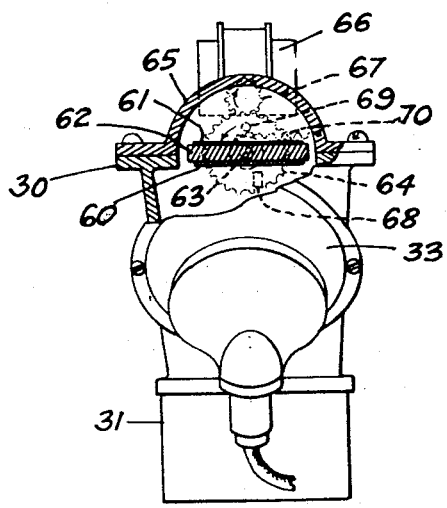
Fig: 5.
INVENTOR:
Louis L. Weisglass
BY Walter E. Wollheim
ATTORNEY.

Patented Aug. 24, 1948

2,447,724

UNITED STATES PATENT OFFICE 2,447,724

COLOR CONTROL FOR PHOTOGRAPHIC ENLARGERS

Louis L. Weisglass, New York, N. Y., assignor, by mesne assignments, to Simmon Brothers, Inc., Long Island City, N. Y., a corporation of New York Application September 4, 1945, Serial No. 614,208

3 Claims. (Cl. 88—24)

The object of this invention is an improved photographic enlarger of the general type that has been broadly disclosed in my co-pending application Serial No. 577,216. The projector assembly of this enlarger comprises a conventional enlarging lens and a conventional condenser, but the source of light is a diffusely reflecting surface disposed substantially in the focal point of this condenser and illuminated by a spotlight. Compared to the conventional arrangement in said focal point of a lamp with an opal vessel and emitting diffused light, this arrangement offers a much better utilization of the available light and permits the application of much higher wattages than heretofore possible. The design of the most successful type of photographic enlarger is based on the following two premises:

1. It is necessary to use diffused light. This is due to the peculiar light scattering property of the photographic emulsion, commonly known as the "Callier effect"; the apparent contrast of a photographic image depends upon the type of light to which it is being exposed, specular or entirely undiffused light forming images of extreme and unusable contrast, but diffused light producing softer prints.

2. It is desirable to use condensers unless one wants to be limited to an extremely low level of light intensity.

These two conditions were satisfied in the past by the customary arrangement of a diffused source of light represented by an incandescent lamp with an opal vessel which was positioned substantially in the focal point of a condenser. This arrangement still has the following two disadvantages:

a. Half of the light of the lamp is emitted rearwardly and lost and cannot be recovered by the use of reflectors since the lamp is so large that the reflected light would have to pass the lamp again. The opal vessel then absorbs ⅔ of the remaining light. As a result, approximately only ⅓ of ½=⅙ or 16.6% of the light can be utilized.

b. It is impossible to obtain higher levels of intensity by increasing the wattage of the lamp. A condenser system is so adjusted that an image of the lamp is projected into the pupil of the enlarging lens. It is desirable that this image be as large or even slightly larger than the pupil of the lens, but it should not be appreciably larger, since light which falls outside of the margins of the lens is obviously lost. This means that the size of the lamp should not exceed certain limits and this, in turn, imposes a very definite limitation upon the wattage which can be used in such a system. Broadly speaking, it cannot be much larger than 150 watts.

These two limitations are overcome in my invention. Instead of the aforementioned lamp with an opal glass vessel, I am using a diffuse reflector substantially in the focal point of the condenser. This reflector is, in turn, illuminated by a suitable spotlight, or by several spotlights. These spotlights may be constructed in any convenient way, but the simplest is to provide a suitable source of light such as an incandescent lamp of the type used in lantern slide or movie projectors together with a specular reflector of suitable, preferably, ellipsoidal or partly ellipsoidal shape.

A well designed spotlight will concentrate approximately 70% of the light emitted by the lamp on a selected spot of the diffuse reflector. A diffuse reflector built from a well chosen material will reflect as much as 90% of this light. The efficiency of the system will then be $.70 \times .90 = .63$ or 63%. This is almost four times as high as the 16.6% computed for the conventional system using an opal lamp. These figures have been verified by actual experiments with a very good degree of approximation.

In addition to this superior efficiency, there is now no longer any limitation upon the wattage that can be utilized in an enlarger of this type. I have successfully built an enlarger with a diffuse reflector according to the principles of this invention which was illuminated by two spotlights of 200 watts each. Compared to a conventional enlarger with an input of 75 watts, this enlarger had a light output approximately 20 times as large in spite of the fact that the wattage was only slightly more than five times as high.

For many purposes it is desirable and necessary to control the color of the light used in a photographic enlarger. For example, by using a blue light, broadly speaking of a wave length of less than 5700 angstrom units, instead of a white light, a slightly but noticeably softer gradation is obtained with most bromide papers. Direct color processes are usually not so well balanced that a perfectly correct color rendition is obtained by exposure with 100% white light, but means are needed by which a slight tint can be given to the applied light in order to compensate for deficiencies of the color sensitive material. For instance, a print exposed with white light may show a greenish tint. This can be improved by changing the color of the applied light to a slightly reddish tint which will restore the proper counter balance. Another application for colored light in an enlarger has been introduced in connection with a bromide paper with a controllable contrast known as "varigam" paper. Exposed to blue light, this paper gives very contrasty prints, but exposed to yellow light, it is extremely "soft,"

and intermediate degrees of gradation can be obtained either by double exposures of blue and green light in various percentages, respectively, or by exposure to various shades of blue-green color mixtures.

Whenever heretofore colored light was needed for any of these applications, it was obtained by the use of filters made either from colored glass, colored gelatin or the like. These filters, however, have a great many disadvantages. If they are placed immediately in front or in back of the enlarging lens, they may be of rather moderate size, but they must be of a very high quality unless the definition of the enlarged image be unfavorably affected; in such case they should really be optical flats. Filters of this high optical quality are prohibitively expensive and are practically never used. If the filter is placed somewhere between the light source and the negative, it need be of reasonably good commercial quality only, since in this position its condition does not appreciably affect the definition of the enlarged image. However, the filters then have to be as large as or larger than the negative, and even if of commercial quality only, they will still be quite expensive. Sometimes a fairly large number of filters may be required and their selection and change may become quite inconvenient.

It is the object of this invention to provide colored light in an enlarger without the use of filters. I accomplish this by the use of colored reflectors in the place of the white reflectors described in two co-pending applications, Serial No. 577,216 and Serial No. 609,873 filed, respectively, Feb. 10, 1945 and Aug. 9, 1945. I have found that metal plates coated with vitreous enamel are very good material for reflectors of this type. Vitreous enamel coatings are available in almost any desired color. They reflect predominately diffused light only, approximately 90% of the total light. The small amount of reflected specular light, 10% or less, can be rendered harmless by arranging the reflector under such an angle that most of the diffused light, but none of the specular light, reaches the condenser. It is also possible to remove the surface gloss which is responsible for this specular light by sand blasting the enamelled plate. The enamelled plate is arranged substantially in the focal point of the condenser of the enlarger and is, in turn, illuminated by one or several spotlights in the manner broadly disclosed in my beforementioned co-pending application, Serial No. 577,216, of which additional refinements were disclosed in another beforementioned co-pending application, Serial No. 609,873.

In the drawings,

Fig. 1 is a front elevational view of an enlarger embodying the principles of my invention, partly in section;

Fig. 2 is a side view of the same, also partly in section;

Fig. 3 is a development of a polygonal cylinder of the enlarger shown in Figs. 1 and 2, carrying various colored reflectors;

Fig. 4 is a front elevational view, partly in section, of a lamp housing of an enlarger equipped with two colored reflectors and a quick change device operable during the exposure; and Fig. 5 is a side view of the same, partly in section.

Like characters of reference denote similar parts throughout the several views and the following specifications.

The enlarger consists of three principal parts, the base, the upright column and the projector assembly.

A base 10 is preferably made from plywood or the like. On this base is fastened a bracket 11, preferably made from cast iron or aluminum which supports two U-channels 12. These channels are arranged either vertically or, preferably, under a slight angle as shown. Slidably mounted on this vertical or nearly vertical column is a projector assembly. This projector assembly consists of a supporting carriage, a focusing assembly with an enlarging lens, and a lamphousing.

The carriage consists of two steel plates 13 which are bolted together by four bolts 14. These bolts serve at the same time as shafts for rollers 15 by means of which the carriage slides with a small amount of friction on the aforementioned channels 12.

The steel plates 13 have a configuration clearly shown in Fig. 2. Each steel plate has a lug 16 adapted to support the lamphousing. A projection 17 is provided which supports a film stage 18 which, of course, has an aperture of the desired size. A negative, preferably supported by one of the well known types of holders is, during operation, placed on this apertured film stage 18; a film holder suitable for this purpose is, for example, shown in Patents No. 2,222,185 and 2,239,760.

A lens carrier 19 is supported by at least one, and preferably two, guide rods 20 and carries the enlarging lens 21. Guide rods 20 run in bearings 22. A focusing device comprising, for example, a rack and pinion movement or the like, not shown in detail, permits the operator to adjust the position of guide rods 20, and therewith of lens support 19 and lens 21, by simply turning hand wheel 23.

The enlarger as described up to this point is quite conventional, and does not depart appreciably from other well known designs.

The lamphousing consists of a main housing 30, preferably an aluminum casting or the like, a condenser with a condenser housing 31 and condenser lenses 32, two spotlights 33, and a colored reflector assembly which will be described in detail below. The spotlight may be of any convenient design, but I prefer the type disclosed in detail in my beforementioned co-pending application, Serial No. 609,873. This type comprises a lamp and a specular reflector. The reflector is formed partly by a paraboloid and partly by an ellipsoid body of rotation. Means are provided by which the lamp can be adjusted within this reflector. These means and other features of this particular spotlight construction have not been shown in detail because they have been fully disclosed in this co-pending application, Serial No. 609,873.

Mounted on top of the lamphousing is a housing 50 which supports a shaft 51. Fastened to this shaft is a hexagonal drum 52. The developed surface of this hexagonal drum is shown in Fig. 3 which also shows a typical example of the relation in which colored reflector plates may be mounted on said drum. The shaft 51 and the drum 52 may be rotated by means of handwheel 53, and it is also possible to shift the entire assembly consisting of handwheel 53 and drum 52 and shaft 51 axially within housing 50. The drum is long enough to support three colored reflectors, side by side on each face of the hexagon, and its hexagonal circumference accommodates six sets of these reflector plates, or altogether eighteen reflector plates may be mounted on this drum, and any of them may be, selectively, by the operator placed into the effective position where it is in the focal point of the condenser and receives light from the two spotlights and reflects it into the condenser. A preferred arrangement is shown in Fig. 3. As can be seen, the colors are arranged in such a pattern that the rotation of the drum will bring reflectors of different colors into operation, and that the axial shift of the drum will effect a change from one color of a given hue to a color of the same hue, but of stronger or weaker saturation. This is a very convenient arrangement and facilitates the making of color prints which may need a color correction of this type.

A basically similar, but in some respects simpler arrangement is shown in Figs. 4 and 5. Only two reflectors 60 and 61 are provided which are mounted on opposite sides of a supporting plate 62. This supporting plate is fastened to a shaft 63 which terminates in a spur gear 64. The entire assembly is mounted in a housing 65 and indexing means are provided comprising a small motor 66 which, by means of another spur gear 67, drives the aforementioned gear 64. The motor 66 is of the type which may be stalled for prolonged period of time without overheating and which is commonly called "torque motor." The rotation of the supporting plate 62 is confined to 180° by means of a fixed stop 68 and a stop pin 65 on gear 64, and a spring 70 is provided which returns the reflector assembly to its original position as soon as the motor 66 is de-energized. An arrangement of this type can very advantageously be used in connection with a variable contrast paper now commercially obtainable. For example, the two reflector plates 60 and 61 may be of a yellow and blue color, respectively. The first portion of the exposure is given with the reflector assembly in the position shown in Fig. 4, i. e., reflector 60 in the lower or effective position. After a certain portion of the exposure has elapsed, current is supplied to the motor 66 which, by means of the gears 67 and 64, rotates shaft 63 and therewith rotates and indexes the supporting plate 62 with the two reflectors 60 and 61. This rotation will come to a stop after 180° when the stop pin 69 comes in contact with the stop 68. From now on, the reflector plate 61 which originally was in the upper or inactive position will now be in the lower position and the balance of the exposure will, therefore, be given by the color determined by the reflector plate 61. After the exposure is finished the motor 66 is disconnected, whereupon spring 70 returns the entire reflector plate assembly to its original position. An arrangement of this type is particularly practical in connection with a timer disclosed in Patent No. 2,399,577 issued to myself and Alfred Simmon on April 30, 1946, where it may serve as a very practical substitute for the electro-magnetic filter shift shown in Figs. 2 and 3 of said application.

It is obvious that many changes of form, proportions and minor details of construction may be resorted to without departing from the principles or sacrificing any of the advantages of the invention as defined in the appended claims.

What I claim as new, is:

1. A photograph enlarger comprising a supporting structure and a projector assembly, said projector assembly including a support for a photographic negative, an enlarging lens in front of said negative, means to adjust the distance from said lens to said negative for focusing purposes, a condenser behind said negative, a polygonal cylinder, a plurality of bodies reflecting predominantly diffuse light of different colors mounted on the sides of said cylinder, one of these sides facing said condenser and being substantially in its focal point, at least one spotlight illuminating said side, and means under the control of the operator to move selectively one of said bodies into the position occupied by said illuminated side by rotating said polygonal cylinder.

2. A photograph enlarger comprising a supporting structure and a projector assembly, said projector assembly including a support for a photographic negative, an enlarging lens in front of said negative, means to adjust the distance from said lens to said negative for focusing purposes, a condenser behind said negative, a polygonal cylinder, a plurality of bodies reflecting predominantly diffuse light of different colors, several of said bodies mounted on each side of said cylinder, one of these sides facing said condenser and a portion of said side being substantially in the focal point of said condenser and being illuminated by at least one spotlight, and means under the control of the operator to rotate said cylinder and to shift it axially whereby selectively one of said colored reflecting bodies may be placed into the position occupied by the illuminated portion of said side.

3. A photographic enlarger comprising a supporting structure and a projector assembly, said projector assembly including a support for a photographic negative, an enlarging lens in front of said negative, means to adjust the distance from said lens to said negative for focusing purposes, a condenser behind said negative, a polygonal cylinder, a plurality of bodies reflecting predominantly diffuse light of different colors, several of said bodies representing progressively more strongly saturated shades of the same color mounted on one of the sides of said cylinder, and similar sets of bodies representing progressively more strongly saturated shades of other colors mounted on the other sides of said polygonal cylinder, one side facing said condenser and a portion of said side being substantially in the focal point of said condenser and being illuminated by at least one spotlight, means under the control of the operator to rotate said cylinder to select the general color of the body to be placed into the illuminated position, and means under the control of the operation to shift said cylinder axially to select the desired saturation of the color of the body to be placed into the illuminated position.

LOUIS L. WEISGLASS.

REFERENCES CITED

The following references are of record in the file of this patent:

UNITED STATES PATENTS

| Number | Name | Date |
|---|---|---|
| 1,675,783 | Beal | July 3, 1928 |
| 1,807,047 | Risdon | May 26, 1931 |
| 2,161,371 | Mees | June 6, 1939 |
| 2,238,008 | Beck et al. | Apr. 8, 1941 |
| 2,346,988 | Noel | Apr. 18, 1944 |
| 2,390,065 | Gelb | Dec. 4, 1945 |